(12) United States Patent
Abt et al.

(10) Patent No.: US 9,956,721 B2
(45) Date of Patent: May 1, 2018

(54) SONOTORODE

(71) Applicant: TETRA LAVAL HOLDINGS & FINANCE S.A., Pully (CH)

(72) Inventors: Jurgen Abt, Breitscheid (DE); Steffen Polster, Hochheim am Main (DE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days. days.

(21) Appl. No.: 15/319,680

(22) PCT Filed: Sep. 9, 2015

(86) PCT No.: PCT/EP2015/070584
§ 371 (c)(1),
(2) Date: Dec. 16, 2016

(87) PCT Pub. No.: WO2016/041828
PCT Pub. Date: Mar. 24, 2016

(65) Prior Publication Data
US 2017/0182703 A1      Jun. 29, 2017

(30) Foreign Application Priority Data
Sep. 18, 2014    (EP) .................................. 14185408

(51) Int. Cl.
*B32B 37/00*        (2006.01)
*B29C 65/08*        (2006.01)
(Continued)

(52) U.S. Cl.
CPC .......... *B29C 65/08* (2013.01); *B29C 65/7802* (2013.01); *B29C 65/7838* (2013.01);
(Continued)

(58) Field of Classification Search
CPC ..... B29C 65/08; B29C 65/74; B29C 66/9221; B29C 66/9231; B29C 66/934; B29C 66/951
(Continued)

(56) References Cited

U.S. PATENT DOCUMENTS 5,058,360 A      10/1991   Yamazaki et al.
5,244,520 A  *   9/1993    Gordon ................... B29C 65/08
                                                         156/580.2
(Continued)

FOREIGN PATENT DOCUMENTS

EP       0 450 146 A1    10/1991
JP       S63-149283 U    9/1988
(Continued)

OTHER PUBLICATIONS

International Search Report (PCT/ISA/220) dated Nov. 12, 2015, by the European Patent Office as the International Searching Authority for International Application No. PCT/EP2015/070584.
(Continued)

*Primary Examiner* — James Sells
(74) *Attorney, Agent, or Firm* — Buchanan Ingersoll & Rooney PC (57)    ABSTRACT

There is described a sonotrode for sealing an opening device onto a hole of a packaging material destined to from a sealed package, comprising: a sealing surface adapted to cooperate with packaging material in order to seal the opening device to the packaging material; a cavity bounded by an opening of sealing surface and adapted to receive the opening device and a ring made in an elastomeric material, partially protruding inside the cavity, and adapted to center a first axis of the opening device on a second axis of the sonotrode.

15 Claims, 5 Drawing Sheets

(51) Int. Cl.
  *B29C 65/78* (2006.01)
  *B29C 65/00* (2006.01)
  *B65D 5/74* (2006.01)
  *B65B 61/18* (2006.01)
  *B29L 31/00* (2006.01)
  *B29K 75/00* (2006.01)
  *B29K 105/04* (2006.01)
  *B31B 50/84* (2017.01)
  *B31B 100/00* (2017.01)
  *B31B 110/35* (2017.01)

(52) U.S. Cl.
  CPC ...... *B29C 65/7841* (2013.01); *B29C 65/7847* (2013.01); *B29C 66/112* (2013.01); *B29C 66/131* (2013.01); *B29C 66/53247* (2013.01); *B29C 66/61* (2013.01); *B29C 66/63* (2013.01); *B29C 66/71* (2013.01); *B29C 66/727* (2013.01); *B29C 66/7234* (2013.01); *B29C 66/72328* (2013.01); *B29C 66/72341* (2013.01); *B29C 66/81431* (2013.01); *B29C 66/81457* (2013.01); *B29C 66/81463* (2013.01); *B29C 66/8322* (2013.01); *B29C 66/8432* (2013.01); *B65B 61/186* (2013.01); *B65D 5/746* (2013.01); *B29C 66/47421* (2013.01); *B29C 66/72321* (2013.01); *B29K 2075/00* (2013.01); *B29K 2105/04* (2013.01); *B29L 2031/7166* (2013.01); *B29L 2031/737* (2013.01); *B31B 50/84* (2017.08); *B31B 2100/00* (2017.08); *B31B 2100/0022* (2017.08); *B31B 2110/35* (2017.08)

(58) Field of Classification Search
  USPC .................................. 156/73.1, 580.1, 580.2
  See application file for complete search history.

(56) References Cited

U.S. PATENT DOCUMENTS

| | | | | |
|---|---|---|---|---|
| 5,304,265 A | * | 4/1994 | Keeler | ............ B29C 65/02 156/366 |
| 5,601,669 A | * | 2/1997 | Moody | ............ B29C 65/08 156/580.1 |
| 5,690,764 A | * | 11/1997 | Dirksing | ............ B29C 65/08 156/309.6 |

FOREIGN PATENT DOCUMENTS

| | | |
|---|---|---|
| JP | S63-188126 U | 12/1988 |
| JP | H04-000525 U | 1/1992 |
| JP | 2002-127254 A | 5/2002 |

OTHER PUBLICATIONS

Written Opinion (PCT/ISA/220) dated Nov. 12, 2015, by the European Patent Office as the International Searching Authority for International Application No. PCT/EP2015/070584.

* cited by examiner

SONOTORODE

TECHNICAL FIELD

The present invention relates to a sonotrode, in particular to a sonotrode for sealing an opening device onto a hole of the packaging material of a sleeve destined to form a sealed package.

BACKGROUND OF INVENTION

Many pourable food products, such as fruit juice, pasteurized or UHT (ultra-high-temperature processed) milk, wine, tomato sauce, etc., are sold in packages made of sterilized packaging material.

A typical example of this type of package is the package for liquid or pourable food products known as Tetra Rex Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

According to a known forming technique, the packaging material is cut into blanks. The blanks are firstly erected to form respective open sleeves, which are sealed at their bottom ends. Afterwards, the open sleeves are filled with the pourable product through their open top ends, and top ends are then sealed, so as to complete the formation of packages.

It is also known to apply an opening device onto a respective open sleeve formed according to the previously described technique, before the filling of the sleeve with the pourable product.

In particular, the opening device comprises:
a flange to be sealed onto the packaging material of the sleeve in an area surrounding a hole thereof;
a neck, which protrudes from the flange; and
a cap, which is screwed onto the neck.

In order to apply each opening device onto the relative sleeve, it is known to use a sealing system comprising:
an anvil; and
a sonotrode.

The anvil is movable, through the open top end of the sleeve, between:
a rest position, in which it is arranged outside the sleeve; and
an operative position, in which it is arranged inside the sleeve.

The sonotrode substantially comprises;
a head, which defines a sealing surface of the sonotrode, which receives the neck and the cap of the opening device; and
one or more drive unit, which comprises a stack of alternate piezoelectric ceramic plates and conductive metal sheets.

The drive unit is coupled to an alternate current generator. In this way, the piezoelectric ceramic plates convert the electrical supplied voltage into a mechanical strain, which causes the oscillation of the head and, therefore, the sealing of the opening device onto the packaging material of the package.

Furthermore, sonotrode is movable, through a hole of the package, between:
a rest position, in which it is arranged outside the sleeve; and
an operative position, in which the opening device engages the hole of the sleeve.

The movement of the sonotrode and the anvil is synchronized with the movement of the open sleeves.

In particular, when both the sonotrode and the anvil are in the respective operative positions, the head of the sonotrode is pressed against the anvil, so as to keep the opening device in a fixed sealing position with respect to the packaging material of the sleeve surrounding the hole.

At this stage, the generator is activated, so as to seal the opening device to the packaging material of the sleeve surrounding the hole.

The Applicant has found that the correct positioning of the opening device inside the sonotrode is very critical for the efficient sealing of the opening device to the respective open sleeve.

In greater detail, the Applicant has found that in case the opening device is not properly positioned inside the sonotrode, there is the risk that the ultrasonic vibration is transferred to the cap of the opening device, instead of to the flange, thus penalizing the sealing of opening devices.

A need is felt within the industry to ensure a proper positioning of the opening device inside the sonotrode.

DISCLOSURE OF INVENTION

It is an object of the present invention to provide a sonotrode, designed to meet at least one of the above-identified requirement.

According to the present invention, there is provided a sonotrode, designed to meet at least one of the above-identified requirement, as claimed in Claim 1.

BRIEF DESCRIPTION OF THE DRAWINGS

A preferred, non-limiting embodiment of the present invention will be described by way of example with reference to the accompanying drawings, in which.

DETAILED DESCRIPTION OF PREFERRED EMBODIMENTS

Number 1 in FIGS. 2 to 6 indicates as a whole a unit for applying a plurality of opening devices 4, 4a onto respective open sleeves 6 destined to from respective packages 2.

In greater detail, each opening device 4, 4a is applied onto a hole 3 (FIGS. 7 and 8) made in a packaging material 5 of respective package 2.

Packaging material 5 is made of a heat-seal sheet material, which comprises a layer of paper material covered on both sides with layers of heat-seal plastic material, e.g. polyethylene. In the case of an aseptic package 2 for long-storage products, such as UHT milk, the packaging material comprises a layer of oxygen-barrier material, e.g. aluminium foil, which is superimposed on one or more layers of heat-seal plastic material eventually forming the inner face of package 2 contacting the food product.

Packages 2 preferably contain a pour-able food product, such as pasteurized or UHT milk, fruit juice, wine, etc.

Before the application of opening device 4, 4a, packaging material 5 is cut into blanks. The blanks are firstly erected to form sleeves 6 (FIGS. 4 to 6) which are sealed at their bottom ends (not-shown), while top ends 7 are still open and with hole 3 (FIGS. 7 and 8) still open.

After the application of opening devices 4, 4a, sleeves 6 are filled with the pourable product through their open top ends 7, and respective top ends 7 are sealed, so as to complete the formation of corresponding packages 2.

In the embodiment shown, opening device 4, 4a (FIGS. 7 and 8) has an axis A and substantially comprises:
 a flange 8, and
 a neck 9 protruding from flange 8 along an axis A; and
 a cap 10 screwed on neck 9.

In particular, the diameter of flange 8 is larger than the diameter of neck 9.

Opening device 4 is preferably made of polyethylene.

The diameter of hole 3 is smaller than the diameter of flange 8 and larger than the diameter of neck 9.

Once applied by unit 1, flange 8 (FIGS. 7 and 8) contacts a side 5a of packaging material 5, neck 9 passes through hole 3 and cap 10 is arranged on a side 5b, opposite to side 5a, of packaging material 5.

Side 5a of packaging material 5 defines the inner side of package 2 and sleeve 6 whereas side 5b defines the outer side of package 2 and sleeve 6.

Unit 1 comprises (FIGS. 2 to 6 and 9, 10):
 a bin (not-shown) which contains opening devices 4, 4a;
 a feeding device 25, which is fed with opening devices 4, 4a and which forms a plurality of columns 24, two in the embodiment shown, of opening devices 4, 4a to be applied on respective sleeves 6;
 a frame 26, which supports a plurality, two in the embodiment shown, of anvils 27;
 a frame 30, which supports a plurality, two in the embodiment shown, of sonotrodes 81; and
 a further feeding device 40 (only partially shown in FIGS. 4 to 6) for advancing packages 2 towards anvils 27 and sonotrodes 81 before the application of opening devices 4, 4a, and for moving away package 2 to which opening device 4, 4a have been applied from anvils 27 and sonotrodes 81 after the application of opening devices 4, 4a.

With reference to FIGS. 2 to 8 it possible to define:
 a direction Y, which is vertical in the embodiment shown;
 a direction X, which is orthogonal to direction Y and horizontal in the embodiment shown; and
 a direction Z, which is orthogonal to directions X, Y.

In the embodiment shown, column 24 extends parallel to direction Y.

Frame 26 is arranged on one side of feeding device 25 and sonotrode 81 is arranged below feeding device 25.

In greater detail, feeding device 25 comprises, for each column 24,
 a chute 36 elongated parallel to direction Y and vertical in the embodiment shown; and
 an expelling device 37, which is movable parallel to direction X towards and away from relative anvil 27.

Each chute 36 comprises a frame, which is shaped in such a way that the lowermost opening device 4a of each column 24 faces, on one side and along direction X, a relative expelling device 37 along direction X.

Furthermore, the frame of each chute 36 is shaped, so as to firmly contain the other opening devices 4 of respective column 24 along directions X, Z and to allow the fall, under the gravity action, of opening devices 4 along direction Y.

Each expelling device 37 comprises a piston 38 which is movable parallel to direction X between a withdrawn position (FIGS. 2 and 4 to 6) and an extended position (FIG. 3), in which it thrusts the lowermost opening device 4a on the opposite side of frame 26 and towards a respective anvil 27.

Feeding device 40 reciprocates parallel to direction Y between:
 a rest position (not-shown), in which sleeves 6 are detached from unit 1; and
 an application position (shown in FIGS. 4 to 7), in which feeding device 40 feeds anvils 2 and sonotrodes 81 with sleeves 6 (only one shown), which have open respective top ends 7 and to which opening devices 4, 4a must still have been applied at respective holes 3.

In the embodiment shown, the rest position is a lowered position along direction Y and the application position in a raised position along direction Y.

Anvils 27 are movable with respect to frame 26 along directions X, Y.

Each anvil 27 is, in particular, movable with respect to frame 26 parallel to direction X, between:
 a rest position (FIGS. 2 and 4), in which anvil 27 is outside relative sleeve 6, and is spaced along direction X from relative chute 36 and corresponding lowermost opening device 4a; and
 a loading position (FIG. 3), in which anvil 27 is adjacent to chute 36 and receives the lowermost opening device 4a by respective expelling device 37 set in the extended position.

Furthermore, each anvil 27 is movable with respect to frame 26 parallel to direction Y and through top end 7 of respective sleeve 6 between:
 the rest position (FIG. 4); and
 an intermediate position (lowered in the embodiment shown in FIG. 5), in which anvil 27 is inside relative sleeve 6 and is detached along direction X from hole 3.

Each anvil 27 is movable with respect to frame 26 and parallel to direction X between:
 the intermediate position; and
 an operative position (FIGS. 6 to 8), in which anvil 27 is inside relative sleeve 6 and places opening device 4a inside hole 3.

Frame 26 comprises a carrier 31, which is movable along direction Y onto a guide of frame 26.

In particular, each anvil 27 comprises:
 an arm 28, L-shaped in the embodiment shown, which is movable with respect to carrier 31 parallel to direction X; and
 a receiving element 29, which is carried by arm 28 and is adapted to grip, by suction action in the embodiment shown, the lowermost opening device 4a of respective column 24 and to transfer it along directions X, Y with respect to frame 26.

In particular, when each anvil 27 (FIG. 3) is in the rest position, an axis of receiving element 29 is aligned, along direction Y with axis A of lowermost opening device 4a of respective column 24, and on the opposite side, along direction X, with an axis of piston 38 of expelling device 37.

Furthermore, the movement of each anvil 27 from the respective rest position to the respective loading position (and vice-versa) is synchronized with the movement of piston 38 of corresponding feeding device 37 between the respective withdrawn position and the respective extended position (and vice-versa).

In particular, when each anvil 27 (FIG. 5) is in the respective loading position, respective receiving element 29 receives lowermost opening device 4a of respective column 24 from piston 38—set in the extended position—of respective expelling device 37.

Differently, when each anvil 27 (FIG. 4) is in the respective rest position, respective receiving element 29 is spaced along direction X from axis A of the lowermost opening device 4a and piston 38, which is set in the withdrawn position.

Each sonotrode 81 is movable parallel to direction X and relative to frame 30 between:
- a rest position (FIGS. 2 to 5), in which it is spaced apart from sleeve 7; and
- an operative position (FIGS. 6 and 7), in which it receives a respective lowermost opening device 4a from receiving element 29 of corresponding anvil 27 and is operated to seal opening device 4a—which engages hole 3—to packaging material 3 of respective sleeve 6 at hole 2.

In particular, the movement of each anvil 27 parallel to direction Y, X and of corresponding sonotrode 81 parallel to direction X is synchronized with the movement of feeding device 40 parallel to direction Y.

Still more precisely, when each anvil 27 moves from the respective rest position to the respective loading position (and vice-versa) and from the respective rest position to the respective intermediate position, respective sonotrode 81 is in the respective rest position and feeding device 40 is in the rest position.

Figure 6:
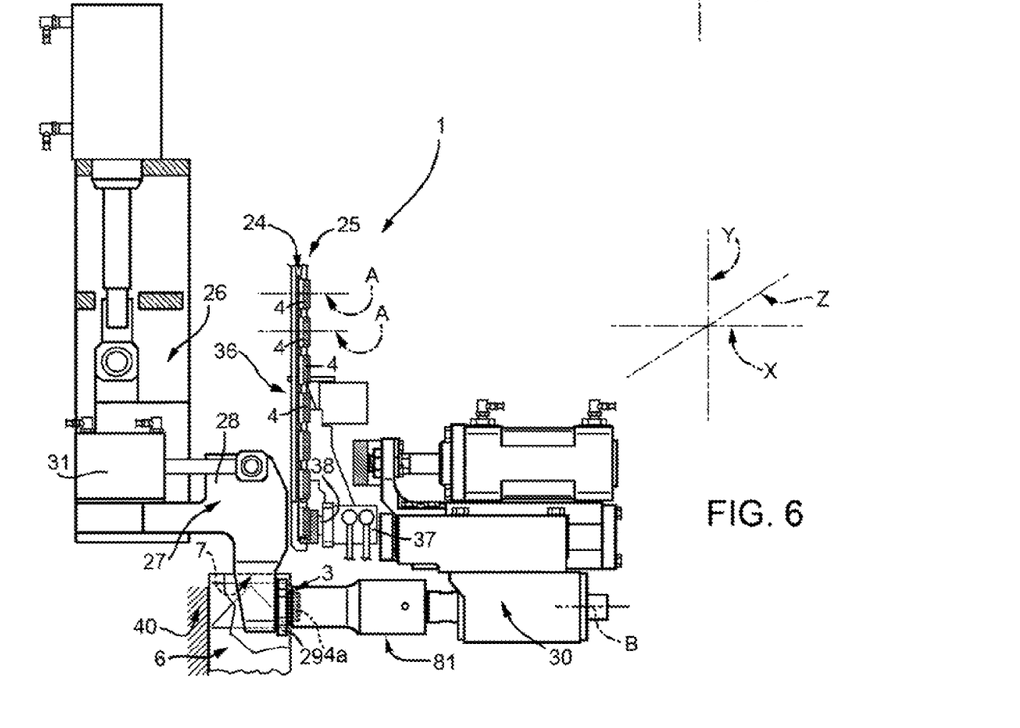
Figure 7:
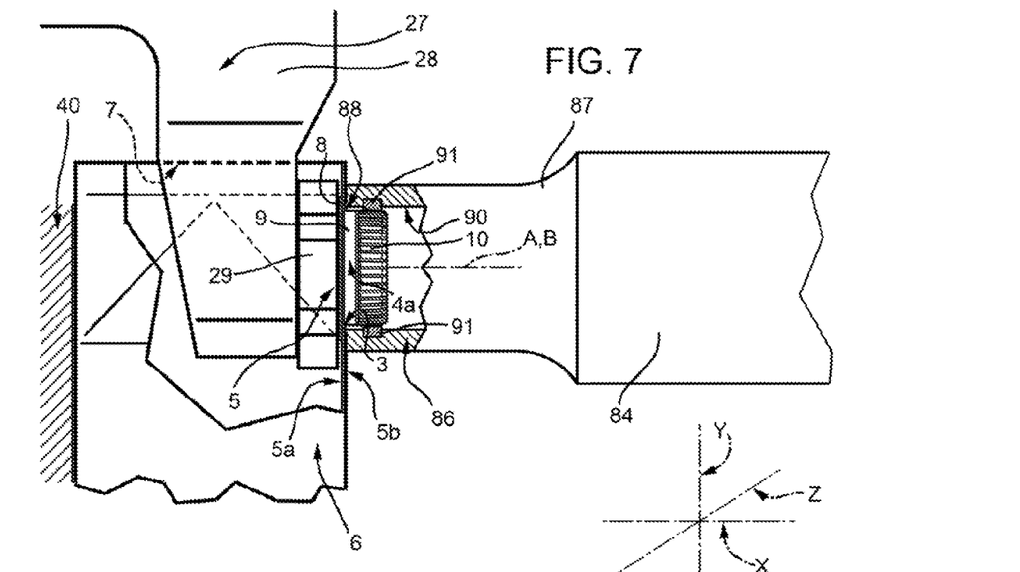
FIG. 7 is an enlarged view the step of FIG. 6.
Figure 8:
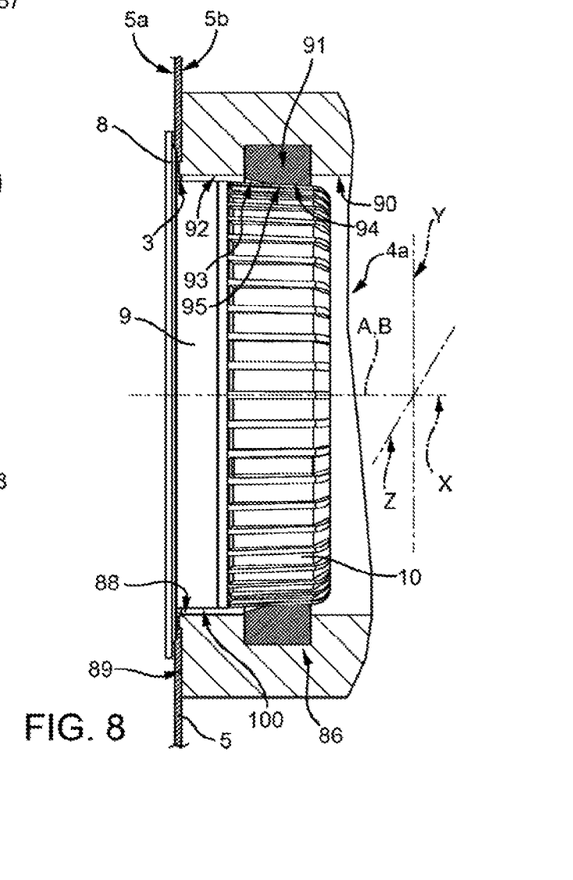
FIG. 8 is a further enlarged view of FIGS. 6 and 7.

Afterwards, each anvil 27 and relative sonotrode 81 reach respective operative positions simultaneously and when feeding device 40 is in the application position (FIGS. 6 to 8).

In this configuration, each anvil 27 exerts a counter-pressure on flange 8 of relative opening device 4a inserted inside hole 3, during the sealing of opening device 4a to packaging material 5 surrounding hole 3 of relative sleeve 6.

In greater detail, each sonotrode 81 comprises (FIGS. 7 to 9):
- a body 84;
- a head 86 opposite to body 84 with respect to direction Y and extending about an axis B parallel to direction Y; and
- a connection 87 interposed between head 86 and body 84.

Figure 9:
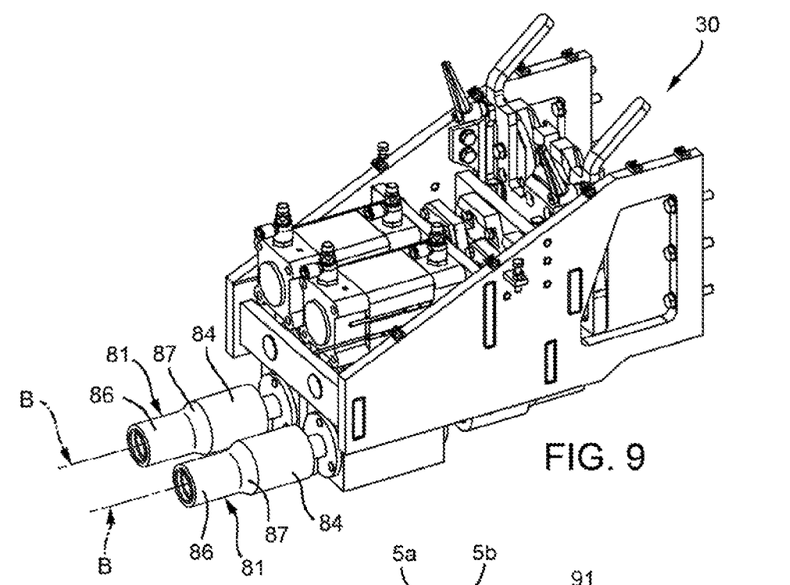
FIGS. 9 and 10 show further components of the sealing unit of FIGS. 2 to 6, with parts removed for clarity.
Figure 10:
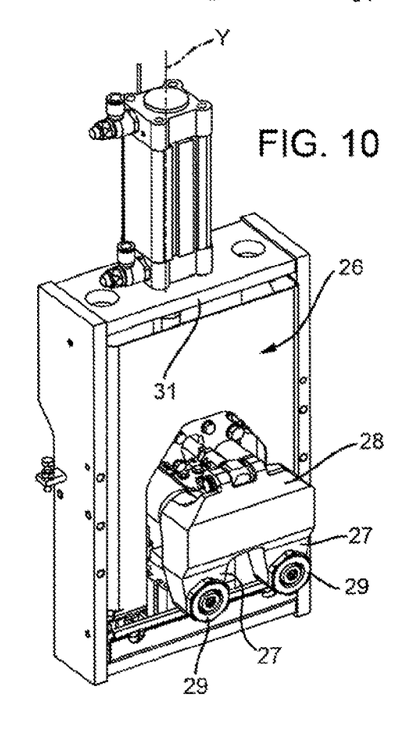

With reference to FIGS. 8 and 9, head 86 defines, on the opposite side of body 84 and towards side 5b of packaging material 5, a sealing surface 89 and an opening 88.

Each sealing surface 89 contacts, when relative sonotrode 81 and corresponding anvil 27 are in the respective operative positions, side 5b of packaging material 5 so as to seal it on flange 8 of respective opening device 4a.

Sonotrode 81 comprises a cavity 90 that extends about axis B, which coincides with axis A when opening device 4a is inserted in cavity 90.

Head 86 is connected, according to a known solution, to a drive unit (not shown).

Drive unit of sonotrode 81 is formed by a stack of alternate piezoelectric ceramic plates and conductive metal sheets and is coupled to an alternate current generator. In this way, the piezoelectric ceramic plates convert the electric power supplied by the alternate current generator into a mechanical strain, which causes the oscillation of head 86 and, therefore, the sealing of flange 8 to side 5a of packaging material 5 surrounding hole 3 of relative sleeve 6.

Cavity 90 receives opening device 4, when the latter is inserted in hole 3 by receiving element 29 of relative anvil 27.

In particular, cavity 90 is bounded by a wall 92 annularly with respect to axis B and by opening 88 axially with respect to axis B and on the side of surface 89.

Advantageously, sonotrode 81 comprises a ring 91 made in elastomeric material, partially protruding inside cavity 90 and adapted to center axis A of opening device 4a on axis B of sonotrode 81.

In greater detail, ring 91 is fitted to wall 92 and protrudes inside cavity 90 from wall 92.

In particular, wall 92 and neck 9 of opening device 4 are separated, radially to axis B by a gap 100 (FIGS. 7 and 8).

Gap 100 is bounded axially between opening 89 and ring 91.

Ring 91 is radially bounded, on the side of axis B, by a wall 95 which tapers, proceeding from opening 88 towards the opposite side of side 3b of web 3, when ring 91 is not deformed.

In particular, wall 95 converges towards axis B, proceeding from opening 88 towards the opposite side of surface 89.

Ring 91 cooperates with cap 10 of opening device 4 and is adapted to center opening device 4 with respect to head 86.

When ring 91 of each sonotrode 81 is deformed (see FIG. 8), wall 95 defines, proceeding from opening 88 towards the opposite side of side 5b of packaging material 5 surrounding hole 3:
- a portion 93 angled at a first angle with respect to axis B; and
- a portion 94 angled at a second angle smaller than first angle with respect to axis B.

Ring 91 is, in the embodiment shown, made of elastomeric material, preferably a thermosetting material.

Still more preferably, ring 91 is made of cellular polyurethane elastomer commercially known as cellasto.

Ring 91 is, therefore, effective to center axis A of opening device 4, 4a with respect to axis B of opening 88 of sonotrode 81, without transferring the ultrasonic vibration to cap 10.

The operation of unit 1 is hereinafter described, with reference to only one anvil 27, only one corresponding sonotrode 81, only one corresponding opening device 4a and only one corresponding sleeve 6 and package 2.

Figure 1:
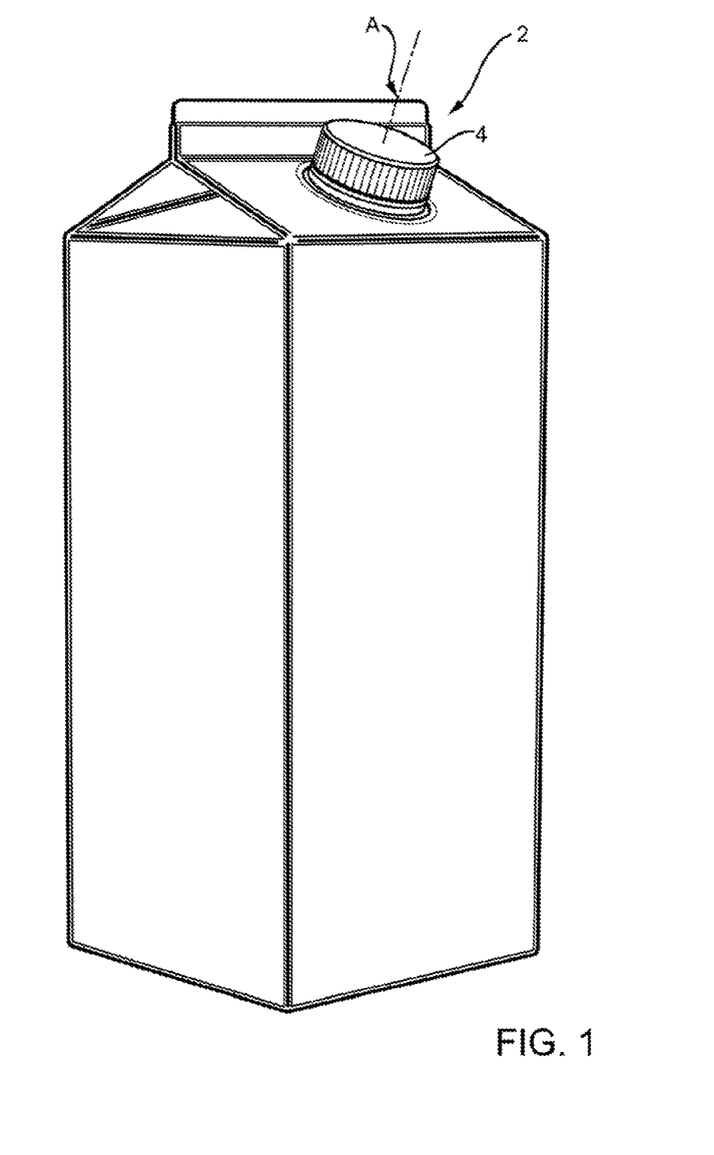
FIG. 1 is a perspective view of a sealed package, which is obtained by using a sonotrode in accordance with the present invention.
Figures 2, 3:
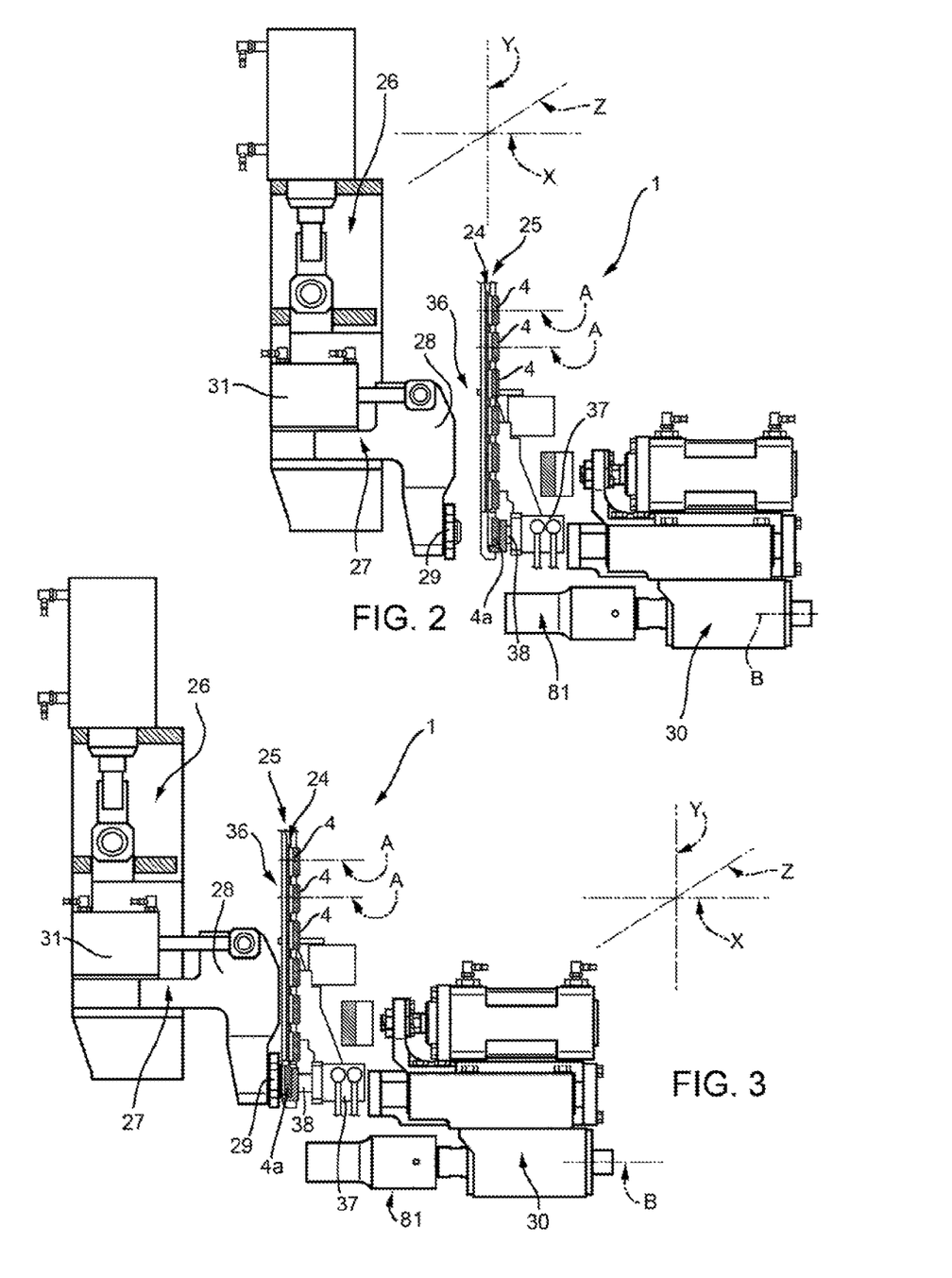
FIGS. 2 to 6 shows respective subsequent steps of an operative cycle of a sealing unit comprising the sonotrode in accordance with the present invention.
Figures 4, 5:
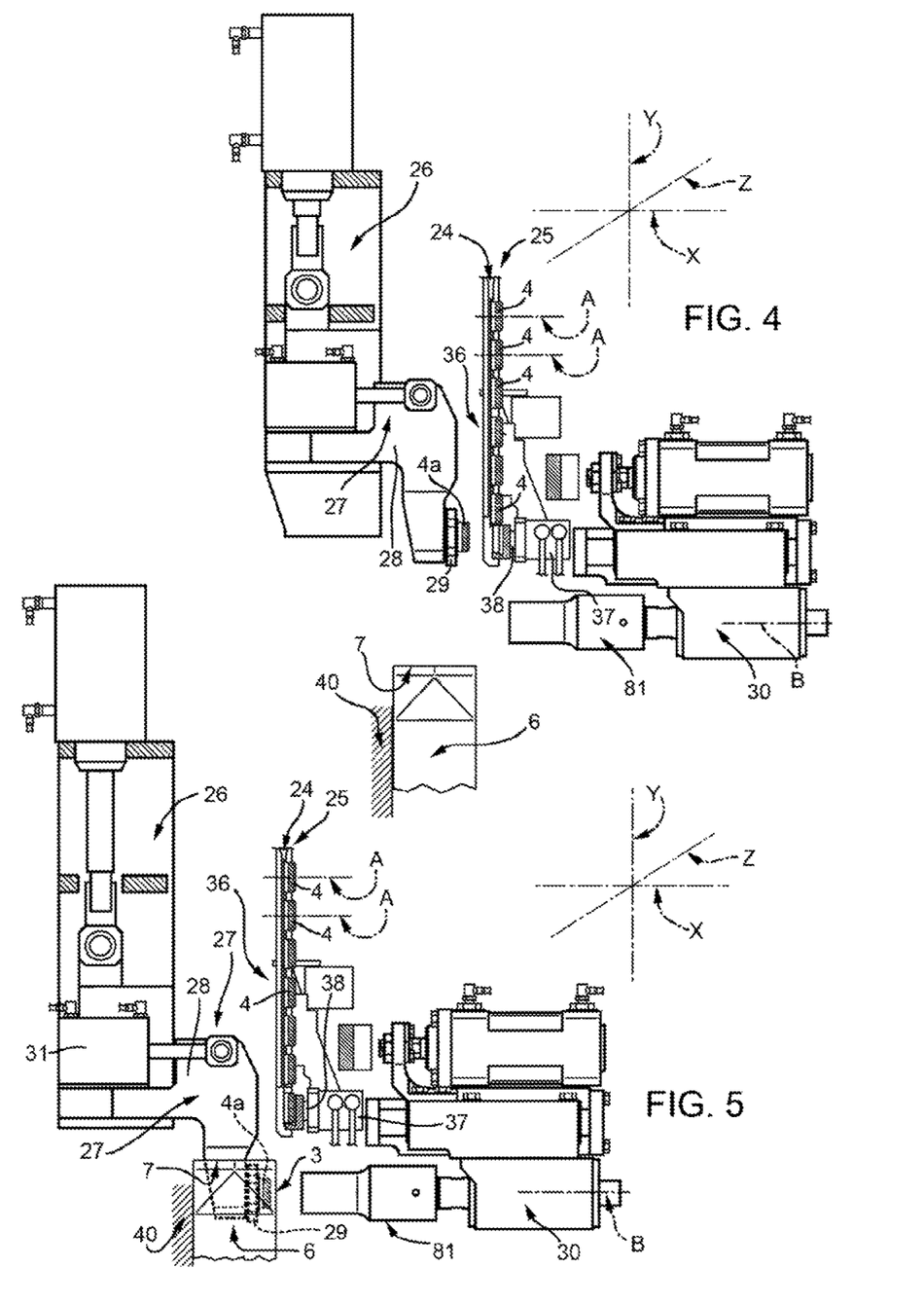

Furthermore, the operation of unit 1 is hereinafter described starting from a condition, in which anvil 27 and sonotrode 81 are in the respective rest positions and feeding device 40 is in the rest position, as shown in FIG. 2.

Starting from this condition, piston 38 of expelling device 37 is moved parallel to direction X and towards the extended position, while anvil 27 moves parallel to direction X and towards chute 36 (i.e. on the right side in FIG. 3) from the rest position to the loading position.

As a result, the lowermost opening device 4a is displaced from chute 36 inside receiving element 29 of anvil 27, which grips it by vacuum action, in the embodiment shown.

At this point, anvil 27 moves back parallel to direction X towards frame 26 up to reach again the rest position (FIG. 4), while feeding device 40 reaches the application position and feeds sonotrode 81 and anvil 27 with sleeve 6 with open top end 7.

At this stage (FIG. 5), anvil 27 moves parallel to direction Y, downwards in the embodiment shown, in the intermediate position. As it moves parallel to direction Y, anvil 27 passes through open top end 7 of sleeve 6 and reaches a position along direction Y, in which receiving element 29 is aligned along direction X with axis of hole 3.

Afterwards (FIG. 6), anvil 27 moves parallel to direction Y and towards hole 3—i.e. on the right side in FIG. 6—from the intermediate position to the operative position, while sonotrode 81 moves parallel to direction X from the rest position to the operative position.

When both anvil 27 and sonotrode 81 are in the respective operative positions (FIGS. 6 to 8), opening device 4a engages hole 3 and is partly housed inside cavity 90 of sonotrode 81.

Still more precisely, when both anvil 27 and sonotrode 81 are in the respective operative positions, neck 9 and cap 10 of opening device 4 enter cavity 90, cap 10 cooperates with wall 95 of ring 91, flange 8 contacts side 5a of packaging material 5 around hole 3 and sealing surface 89 contacts side 5a of packaging material 5 of package 2 (FIG. 9).

Furthermore, cap 10 deforms wall 92 of ring 91, so as to create portion 93, 94 (FIG. 9) differently angled with respect to axis B of head 86 of sonotrode 81.

In this way, ring 91 effectively centers axis A of opening device 4 with axis B of head 86.

Finally, when neck 9 and cap 10 of opening device 4 are housed inside cavity 90 of sonotrode 81, gap 100 is created between wall 92 and cap 10 (FIGS. 7 and 8).

At this stage, sonotrode 81 is activated and head 86 oscillates, so as to seal opening device 4 to packaging material 5 of sleeve 6 around hole 3.

Once the sealing has been completed, sonotrode 81 and anvil 27 come back in respective rest position, and feeding device 40 come back in the rest position.

Subsequently, in a not shown way, top end 7 of sleeve 6—to which opening device 4a has been applied—is sealed, so as to complete the formation of package 2.

At this stage, sonotrode 81 comes back in the rest position along direction X, anvil 27 comes back in the intermediate position along direction X and in the rest position along direction Y, and the cycle re-starts again.

The advantages of unit 1 according to the present invention will be clear from the foregoing description.

In particular, ring 91 made in elastomeric material is efficient in centering opening devices 4a inside cavities 90 of respective sonotrodes 81, without transferring the ultrasonic vibration to caps 10 and, therefore, without affecting the sealing of opening devices 4a onto the packaging material 5 surrounding hole 3.

Ring 91 is conical and tapers on the opposite side of opening 88 and surface 89.

In this way, the contact area between rings 91 and relative caps 10 is particularly small.

Finally, thanks to the presence of gap 100, only surface 89 of sonotrode 81 contacts opening device 4a. Accordingly, thanks to the presence of gap 100 the mechanical oscillation of sonotrode 81 is transferred correctly to flange 8 of opening device 4a with no useless transfer to neck 7 and cap 10 of opening device 4a.

Clearly, changes may be made to sonotrode 81 without, however, departing from the protective scope defined in the accompanying Claims.

In particular, sonotrode 81 could be used for applying a pre-formed opening device 4 onto a web of packaging material which will be folded into a tube, transversally heat-sealed and transversally cut so as to form a plurality of sealed packages.

The invention claimed is:

1. A sonotrode for sealing an opening device onto a hole of a packaging material destined to form a sealed package, comprising:
    a sealing surface adapted to cooperate with a said packaging material in order to seal said opening device to said packaging material;
    a cavity bounded by an opening of said sealing surface and adapted to receive said opening device;
    a ring of elastomeric material, partially protruding inside said cavity, and the ring comprising a wall configured in use to contact a portion of the opening device and to be elastically deformed to center a first axis of said opening device on a second axis of said sonotrode;
    the wall facing towards the second axis and being tapered, the wall that faces the second axis and that is tapered including, proceeding from the opening towards a side opposite the opening, a first portion and a second portion;
    the first portion of the wall being angled at a first angle with respect to the second axis;
    the second portion of the wall being angled at a second angle with respect to the second axis; and
    the first and second angles being different from one another.

2. The sonotrode of claim 1, wherein said sealing surface contacts, in use, a side of the packaging material defining an outer side of the package.

3. The sonotrode of claim 1, wherein said second angle is smaller than said first angle.

4. The sonotrode of claim 1, comprising a further wall, which bounds said cavity and from which said ring radially protrudes, so as to create, in use, a gap between said further wall and said opening device.

5. The sonotrode of claim 1, wherein said elastomeric material is a thermosetting material.

6. The sonotrode of claim 1, wherein the elastomeric material is a cellular polyurethane elastomer.

7. A unit operable to apply an opening device onto packaging material destined to form a sealed package, the unit comprising:
    a sonotrode in combination with an anvil;
    the sonotrode and the anvil, during operation of the unit, being relatively movable with a portion of the packaging material positioned between the sonotrode and the anvil so that the sonotrode is on one side of the packaging material and the anvil is on an opposite side of the packaging material;
    the anvil gripping the opening device during the operation of the unit to move the opening device toward a through hole in the portion of the packaging material and to position the opening device in the through hole in the portion of the packaging material;
    the sonotrode comprising:
        a sealing surface adapted to cooperate with the packaging material when the opening device is positioned in the through hole in the portion of the packaging material to seal the opening device to the packaging material;
        a cavity bounded by an opening of the sealing surface and configured to receive the opening device positioned in the through hole in the portion of the packaging material; and a ring made of elastomeric material and protruding inside the cavity to contact the opening device when the opening device is received in the cavity and to center a first axis of the opening device on a second axis of the sonotrode.

8. The unit of claim 7, wherein the packaging material is a sleeve of packaging material and the anvil is movable through an opening at one end of the sleeve between:

a rest position; and an operative position in which the anvil cooperates with said opening device during said sealing of said opening device to said packaging material.

9. The unit of claim 8, wherein said opening at one end of the sleeve is sealed after the sealing of said opening device onto said sleeve, so as to form said sealed package.

10. The unit according to claim 7, wherein the ring comprises a wall possessing an inner peripheral surface facing towards the second axis, the inner peripheral surface of the wall which faces towards the second axis being tapered to include, proceeding from the opening towards a side opposite the opening, a first portion and a second portion, the first portion of the wall being angled at a first angle with respect to the second axis, the second portion of the wall being angled at a second angle with respect to the second axis, and the first and second angles being different from one another.

11. The unit of claim 7, wherein the second angle is smaller than the first angle.

12. The unit of claim 7, comprising a further wall, which bounds the cavity and from which the ring radially protrudes to create, in use, a gap between the further wall and the opening device.

13. A method of applying an opening device onto packaging material destined to form a sealed package, the method comprising:

moving an opening device located on one side of the packaging material toward a through hole in the packaging material, the packaging material including an opposite side that is opposite the one side;

positioning the opening device in the through hole in the packaging material so that a first part of the opening device projects beyond the opposite side of the packaging material and a second part of the opening device contacts the one side of the packaging material;

moving a sonotrode toward the opposite side of the packaging material, the sonotrode comprising a cavity and a ring made of elastomeric material that protrudes inside the cavity;

the moving of the sonotrode comprising moving the sonotrode to position the first part of the opening device in the cavity while the ring contacts the opening device and is deformed to center a first axis of the opening device on a second axis of the sonotrode; and operating the sonotrode while a sealing surface of the sonotrode is in contact with the second side of the packaging material to seal the second part of the opening device to the packaging material.

14. The method according to claim 13, wherein the ring comprises a wall possessing an inner peripheral surface facing towards the second axis, the inner peripheral surface of the wall which faces towards the second axis being tapered to include, proceeding from an open end of the opening device towards a side opposite the open end, a first portion and a second portion, the first portion of the wall being angled at a first angle with respect to the second axis, the second portion of the wall being angled at a second angle with respect to the second axis, and the first and second angles being different from one another.

15. The method of claim 14, wherein the second angle is smaller than the first angle.

* * * * *